United States Patent
Wang

(10) Patent No.: US 9,189,830 B2
(45) Date of Patent: Nov. 17, 2015

(54) IMAGE DEFOGGING METHOD AND SYSTEM

(75) Inventor: Bingrong Wang, Shanghai (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/239,695

(22) PCT Filed: Aug. 28, 2012

(86) PCT No.: PCT/CN2012/001163
§ 371 (c)(1),
(2), (4) Date: Feb. 19, 2014

(87) PCT Pub. No.: WO2013/029337
PCT Pub. Date: Mar. 7, 2013

(65) Prior Publication Data
US 2014/0205192 A1    Jul. 24, 2014

(30) Foreign Application Priority Data
Aug. 30, 2011    (CN) .......................... 2011 1 0269580

(51) Int. Cl.
*G06K 9/00*    (2006.01)
*G06T 5/00*    (2006.01)

(52) U.S. Cl.
CPC . *G06T 5/00* (2013.01); *G06T 5/003* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 7,733,476 B2* | 6/2010 | Kanzaki et al. | 356/237.4 |
| 8,194,233 B2* | 6/2012 | Bamji | 356/5.01 |
| 8,249,303 B2* | 8/2012 | Nitanda | 382/104 |
| 8,340,461 B2* | 12/2012 | Sun et al. | 382/275 |
| 8,755,628 B2* | 6/2014 | Fang et al. | 382/274 |
| 2010/0040300 A1* | 2/2010 | Kang et al. | 382/255 |
| 2010/0067823 A1* | 3/2010 | Kopf et al. | 382/274 |

(Continued)

FOREIGN PATENT DOCUMENTS

| | | |
|---|---|---|
| CN | 101221655 | 7/2008 |
| CN | 101783012 | 7/2010 |

(Continued)

OTHER PUBLICATIONS

Peng et al, Single Image Fog Removal Based on Dark Channel Prior and Local Extrema, American Journal of Engineering and Technology Research vol. 12, No. 2, 2012.*

(Continued)

*Primary Examiner* — Andrae S Allison
(74) *Attorney, Agent, or Firm* — Staas & Halsey LLP

(57) ABSTRACT

Image defogging method and system. The method includes: acquiring minimum intensity values corresponding to pixels in a foggy image, and selecting the largest values of intensity values of R, G, and B channels of pixels in an area, covered by a brightest area of a predetermined size in a local minimum intensity image, in the foggy image as component values of R, G, and B channels of an atmosphere light value; acquiring a transformation image of the foggy image with atmosphere light value of the foggy image; acquiring a transmission map of the foggy image by edge-preserving filtering the transformation image; and acquiring intensity values of R, G, and B channels of pixels in a defogged image using transmission map and atmosphere light value of the foggy image and intensity values of R, G, and B channels of pixels in the foggy image.

10 Claims, 5 Drawing Sheets

(56) References Cited

U.S. PATENT DOCUMENTS

2011/0188775 A1* 8/2011 Sun et al. ............... 382/274
2014/0140619 A1* 5/2014 Mukhopadhyay et al. ... 382/167

FOREIGN PATENT DOCUMENTS

CN 101908210 12/2010
CN 102063706 5/2011

OTHER PUBLICATIONS

Tripathi, A.K.; Mukhopadhyay, S., "Single image fog removal using bilateral filter," Signal Processing, Computing and Control (ISPCC), 2012 IEEE International Conference on , vol., no., pp. 1,6, Mar. 15-17, 2012.*

C. Xiao and J. Gan, "Fast image dehazing using guided joint bilateral filter," Vis. Comput. 28(6-8), 713-721, (2012).*

Lv et al, Real-time Dehazing for Image and Video, 2010 18th Pacific Conference on Computer Graphics and Applications.*

He, K., Sun, J., Tang, X.: Single image haze removal using dark channel prior. In:CVPR (2009).*

International Search Report mailed Nov. 29, 2012 in corresponding International Patent Application No. PCT/CN2012/001163.

D. Lischinski et al., "Interactive Local Adjustment of Tonal Values," *ACM Transactions on Graphics (TOG)*, vol. 25. No. 3., 2006.

Z. Farbman et al., "Edge-Preserving Decompositions for Multi-Scale Tone and Detail Manipulation," *ACM Transactions on Graphics*, vol. 27, No. 3, Article 67, Aug. 2008, 10 pages.

K. He et al., "Signal Image Haze Removal Using Dark Channel Prior," *Conference on ComputerVision and Pattern Recognition (CVPR)* 2009, Jun. 2009, 7 pages.

Y. Jingyu et al., "Using Dark Channel Prior to Quickly Remove Haze from a Single Image," *Geomatics and Information Science of Wuhan University*, vol. 35, No. 11, Nov. 2010, pp. 1292-1295 and 1 page For English abstract.

W. Hu et al., "Improved Single Image Dehazing Using Dark Channel Prior," *Journal of Computer Research and Development*, vol. 47, No. 12, Dec. 2010, 11 pages.

Chinese Office Action issued Sep. 19, 2014 in corresponding Chinese Patent Application No. 201110269580.0.

Wei Yulan et al., "Adaptive Edge Enhancement Method for Steel Strip Surface Defect Image", China Mechanical Engineering, vol. 21, No. 5, Mar. 3, 2010, pp. 571-574.

* cited by examiner

IMAGE DEFOGGING METHOD AND SYSTEM

CROSS-REFERENCE TO RELATED APPLICATIONS

This application is a U.S. national stage application of PCT/CN2012/001163 filed Aug. 28, 2012 and claims foreign priority benefit of Chinese Patent Application No. 201110269580.0 filed Aug. 30, 2011 in the Chinese Intellectual Property Office, the contents of both of which are incorporated herein by reference.

FIELD OF THE INVENTION

The invention relates to image processing, particularly relates to an image defogging method and system.

BACKGROUND OF THE INVENTION

In the case that the weather is bad, the visibility and color of an image are usually degraded by the fog in the atmosphere. It is usually needed to improve the quality of images and videos captured in the weather by defogging. The process of removing the fog in an image is called image defogging.

Currently, there are many image defogging methods, in which an image defogging method based on dark channel prior is a method having the best effect. The dark channel prior is obtained by making statistics on an outdoor non-foggy image database, i.e. every local areas in outdoor non-foggy images have a pixel, the intensity value of at least one color channel of which is very low. A defogging model established by utilizing the dark channel prior can directly estimate the thickness of the fog, and can restore a foggy image to a high quality image after removing the interference of the fog (called defogged image for short).

In the image defogging method based on dark channel prior, an intensity value "J" of a defogged image is solved by using an intensity value "I", an atmosphere light value "A", and a transmission map t of an input fogging image according to a foggy image model I=Jt+A(1−t).

Currently, there are the following two image defogging methods based on dark channel prior: 1) acquiring a transmission map for performing defogging processing on the foggy image based on dark channel prior, optimizing the transmission map by soft matting interpolation, and solving the intensity value of the defogged image by using the optimized transmission map. The defect of this method lies in that the processing of soft matting interpolation takes too much time, leading to the completion of the processing of image defogging taking too much computation time. 2) filtering the minimum values of R, G, B components of every pixels in an input image by using a median filter to obtain the atmosphere light value and the transmission map for performing defogging processing on the input image, and solving the intensity value of the defogged image by using the atmosphere light value and the transmission map. The defect of this method lies in that existing median filters cannot obtain a defogged image of good enough effect.

SUMMARY OF THE INVENTION

In view of the above described problems, a image defogging method and system is provided.

A method for image defogging according to an embodiment of the invention comprises: acquiring minimum intensity values corresponding to every pixels in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively; acquiring a transformation image of the foggy image by transforming the foggy image with the atmosphere light value of the foggy image; acquiring a transmission map of the foggy image by edge-preserving filtering the transformation image of the foggy image; and acquiring intensity values of R channels, G channels, and B channels of every pixels in a defogged image by using the transmission map and the atmosphere light value of the foggy image and the intensity values of R channels, G channels, and B channels of every pixels in the foggy image.

A system for image defogging according to an embodiment of the invention comprises: an atmosphere light value acquiring unit for acquiring minimum intensity values corresponding to every pixels in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively; a foggy image transforming unit for acquiring a transformation image of the foggy image by transforming the foggy image with the atmosphere light value of the foggy image; a transmission map acquiring unit for acquiring a transmission map of the foggy image by edge-preserving filtering the transformation image of the foggy image; and a defogged image acquiring unit for acquiring intensity values of R channels, G channels, and B channels of every pixels in a defogged image by using the transmission map and the atmosphere light value of the foggy image and the intensity values of R channels, G channels, and B channels of every pixels in the foggy image.

As compared with the image defogging method based on dark channel prior and soft matting, the invention significantly reduces the computation complexity at the same of preserving a good defogging effect and thus significantly reduces the time of defogging processing. As compared with the image defogging method based on a median filter, the invention provides a relatively high image quality while the time of defogging processing slightly reduces.

BRIEF DESCRIPTION OF THE DRAWINGS

The invention can be better understood from the following descriptions of the embodiments of the invention in combination with the accompany drawings, wherein.

DETAILED DESCRIPTION OF THE INVENTION

Features of respective aspects and example embodiments of the invention will be described in detail below. The following descriptions involve many specific details so as to provide a thorough understanding of the invention. However, it is obvious to the person skilled in the art that the invention can be implemented without some of the specific details. The following descriptions of the embodiments are merely for providing clearer understanding of the invention by means of illustrating examples of the invention. The invention is not limited to any specific configuration and algorithm provided below, and covers any modification, alteration and improvement of relevant elements, components and algorithms without going beyond the spirit of the invention.

In computer visual and computer graphic field, a foggy image model described in the following equation is widely used:

$$I(x)=J(x)t(x)+A(x)(1-t(x)) \quad (1)$$

Wherein, I(x) represents the intensity value of a pixel "x" in an observed foggy image, J(x) represents the intensity value of the pixel "x" in a defogged image obtained by defogging processing of the foggy image, A(x) represents an atmosphere light value of the foggy image, and t(x) represents a transmission ratio of the pixel "x" in the foggy image. It is noted that the size of the foggy image is the same as that of the defogged image, and the pixel "x" in the foggy image corresponds to the pixel "x" in the defogged image, i.e. they are located at a same position in the foggy image and the defogged image.

The purpose of image defogging is to restore intensity values J(x) of every pixels "x" in the defogged image from intensity values I(x) of every pixels "x" in the foggy image. Before solving the intensity values J(x) of every pixels "x" in the defogged image, it is needed to estimate the atmosphere light value A(x) of the foggy image and transmission ratios t(x) of every pixels in the foggy image from the intensity values I(x) of every pixels "x" of the foggy image. The following equation can be derived from the above foggy image model:

$$J(x) = \left( \frac{I(x) - A(x)}{t(x)} + A(x) \right) \quad (2)$$

In order to make the defogged image brighter, it is usually to modify the intensity values J(x) of every pixels "x" in the defogged image by the following equation:

$$J(x) = \alpha \times \left( \frac{I(x) - A(x)}{t(x)} + A(x) \right) \quad (3)$$

Wherein, "α" represents a modification coefficient for the intensity values J(x) of every pixels "x" in the defogged image, and its value is for example, 1.15.

Figure 1:
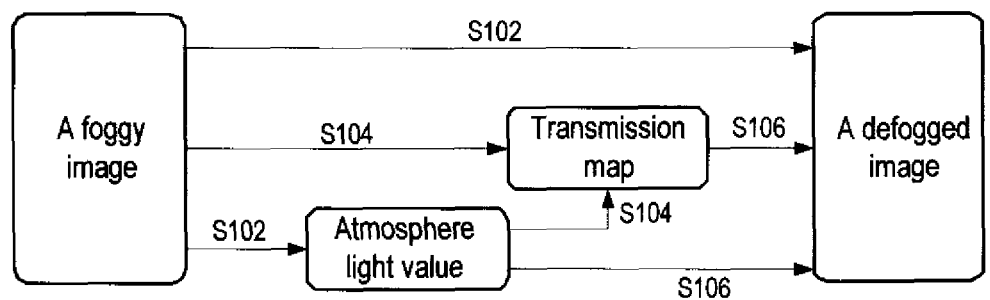
FIG. 1 illustrates a brief flow chart of a traditional image defogging method based on dark channel prior.

The defogging processing of the foggy image usually comprises the following steps (as illustrated in FIG. 1): S102, estimating atmosphere light values A(x) of every pixels "x" in the foggy image according to the intensity values I(x) of every pixels "x" in the foggy image (the air light values A(x) of all pixels in the foggy image are equal, i.e. all pixels in the foggy image have a same atmosphere light value "A", so it can be deemed that the foggy image has an atmosphere light value "A"); S104, deriving the transmission ratios t(x) of every pixels "x" in the foggy image according to the intensity values I(x) and the atmosphere light values A(x) of every pixels "x" in the foggy image (i.e. the transmission ratios t(x) of all pixels "x" in the foggy image constitute a transmission map "t" of the foggy image, so step S104 can be considered as a processing of deriving the transmission map "t" of the foggy image); S106, restoring the intensity values J(x) of every pixels "x" in the defogged image according to the intensity values I(x), the atmosphere light values A(x), and the transmission rations t(x) of every pixels in the foggy image.

The invention focuses on the improvement of steps S102 and S104. The improvement of steps S102 and S104 is described in detail below.

Estimating the Air Light Value "A" of the Foggy Image

In order to estimate the atmosphere light value "A" of the foggy image, the intensity values I(x) of every pixels "x" in the initial foggy image need to be filtered firstly by using a local minimum filter.

Specifically, a local minimum intensity image of the foggy image is acquired by using the local minimum filter. That is to say, minimum intensity values corresponding to every pixel "x" in the foggy image are found out according to the following equation to constitute the local minimum intensity image of the foggy image.

$$I_{min}(x) = \min_{y \in \omega(x)} \left( \min_{c \in \{R,G,B\}} (I^C(y)) \right) \quad (4)$$

Wherein, ω(x) represents a local pixel block centered on any one pixel "x" in the foggy image, $I^C$ (y) represents intensity values of R, G or B channel of any one pixel "y" in the local pixel block ω(x), and $I_{min}$(x) represents an intensity value that is the smallest one of the intensity values of all channels of all pixels in the local pixel block ω(x). As to a pixel near to a boundary of the foggy image, if a local pixel block ω(x) centered on the pixel exceeds the boundary of the foggy image, pixels in a part that exceeds the foggy image are omitted, i.e. only valid pixels in the foggy image are used to calculate the local minimum intensity image.

Different from the existing method in which the size of the local pixel block is a predetermined size (15*15), the size of the local pixel block can be set according to the size of the foggy image in this embodiment.

Here, it is assumed that the length of the foggy image includes "R" pixels, the width of the foggy image includes "S" pixels, the length of the local pixel block ω(x) includes "r" pixels, and the width of the local pixel block ω(x) includes "s" pixels, then $$r=\text{odd\_round}(R/15) \quad (5)$$

$$s=\text{odd\_round}(S/15) \quad (6)$$

That is to say, "r" takes an odd number closest to "R/15", and "s" takes an odd number closest to "S/15". For example, if the size of the foggy image is 600*400, the size of the local pixel block ω(x) is 41*27.

After the minimum intensity values corresponding to every pixels "x" in the foggy image are found out and the local minimum intensity image corresponding to the foggy image is constituted by using the minimum intensity values, a brightest area that is 0.1% of the local minimum intensity image is found out, and for all pixels in an area covered by the brightest area in the foggy image, largest values of the intensity values of R channels, G channels, B channels of the pixels are selected as component values of R, G, B channels of the atmosphere light value "A" of the foggy image, that is $$A^c = \max_{p \in U}(I^c(p)) \quad (7)$$

Wherein, "U" represents the area covered by the brightest area in the foggy image, and $A^c$ represents the atmosphere light value of the foggy image.

Deriving the Transmission Map "t" of the Foggy Image

According to the foggy image model $I(x)=J(x)t(x)+A(x)(1-t(x))$, the following equations can be derived:

$$\left(1 - \frac{I^c(x)}{A^c}\right) = \left(1 - \frac{J^c(x)}{A^c}\right)t(x) \quad (8)$$

$$\left(1 - \min_{c \in \{R,G,B\}} \frac{I^c(x)}{A^c}\right) = \left(1 - \min_{c \in \{R,G,B\}} \frac{J^c(x)}{A^c}\right)t(x) \quad (9)$$

The transmission ratio t(x) of each pixel in the foggy image usually is related with the distance between a camera that acquires the foggy image and an object (a scene) at which the pixel in the foggy image is located, i.e. the scene depth "d". An ideal edge-preserving filter will neither obscure prominent edges in an image nor sharpen the prominent edges while filtering areas between the prominent edges in the image. Usually, pixels in an area between prominent edges in an image have substantially the same scene depth, so pixels in the area will have substantially the same transmission ratio. That is to say, the following equation can be obtained:

$$F_{edge}\left(1 - \min_{c \in \{R,G,B\}} \frac{I^c(x)}{A^c}\right) = t(x) * F_{edge}\left(1 - \min_{c \in \{R,G,B\}} \frac{J^c(x)}{A^c}\right) \quad (10)$$

Wherein, $F_{edge}()$ represents an edge-preserving filter function.

According to the dark channel prior, the following equation can be obtained:

$$F_{edge}\left(1 - \min_{c \in \{R,G,B\}} \frac{J^c(x)}{A^c}\right) \approx 1 \quad (11)$$

Therefore, the transmission ratios of every pixels in the foggy image can be obtained according to the following equation:

$$t(x) = F_{edge}\left(1 - \min_{c \in \{R,G,B\}} \frac{I^c(x)}{A^c}\right) \quad (12)$$

In order to preserve some foggy effect in a foggy image, the scene depth of which as a whole is relatively large, a constant coefficient w ($0 < w \leq 1$) is introduced to the above equation, then $$t(x) = F_{edge}\left(1 - w \times \min_{c \in \{R,G,B\}} \frac{I^c(x)}{A^c}\right) \quad (13)$$

Here, it is assumed that w=0.85.

In the image defogging method based on dark channel prior in accordance with an embodiment of the invention, it is proposed to perform edge-preserving filtering by using a weighted least squares (WLS) filter. After deriving t(x), it must be modified into a range of [0.1, 1.0].

The Traditional WLS Filter

The traditional WLS filter filters an input image by using the following linear system to obtain an output image that is filtered:

$$Bu = g \quad (14)$$

wherein $$B_{ij} = \begin{cases} -\lambda(|L_i - L_j|^\alpha + \varepsilon)^{-1} & j \in N_4(i) \\ 1 - \sum_{k \in N_4(i)} B_{ik} & i = j \\ 0 & \text{otherwise} \end{cases} \quad (15)$$

Wherein, "g" represents the input image, "u" represents the output image, and L=ln(g). "i" and "g" represents the number of elements that are increasingly marked from left to right and from top to bottom in a matrix, $N_4(i)$ represents four adjacent elements at the top, the bottom, the left and the right sides of an element (or a pixel) "i" in the matrix. "$\alpha$" and "$\lambda$" are two parameters. "$\alpha$" is used to determine a gradient of the input image "g", and "$\lambda$" is used to control the degree of smoothness processing. "$\varepsilon$" is a very small constant, and it usually takes a value of "0.0001".

Figure 2:
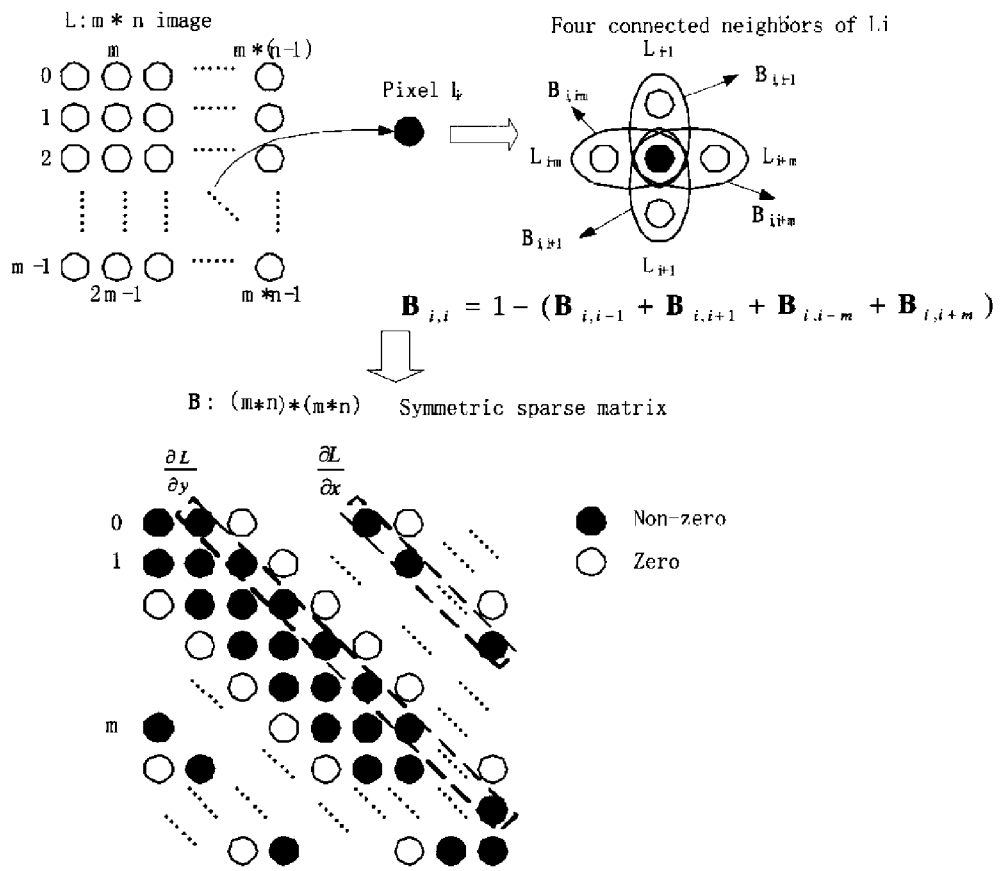
FIG. 2 illustrates a process of a traditional WLS filter constructing a matrix "B"

The process of constructing the matrix "B" is illustrated in FIG. 2. Here assuming that a matrix "L" includes m (rows)*n (columns) pixels, and the matrix "B" includes (m*n)*(m*n) elements. As to any one element "$B_{i,j}$" in the matrix "B", it is needed to consider an element "$L_i$" and four adjacent elements that are located at the top, the bottom, the left and the right sides of the pixel "$L_i$" in the matrix "L" to obtain the element "$B_{i,j}$". That is to say, it is needed to consider a pixel "$P_i$" and four adjacent pixels that are located at the top, the bottom, the left and the right sides of the pixel "$P_i$" in the input image. So the matrix "B" merely includes non-zero elements on five diagonal lines. The values of elements on a main diagonal line of the matrix "B" are constant, such that the arithmetic sum of every row of pixels in the matrix "B" is "1". Obviously, the matrix "B" is a sparse symmetric matrix.

If Cholesky decomposition method is used, then the time complexity of solving the linear system Bu=g is $O((m*n)^2)$.

A Fast WLS Filter

The fast WLS filter filters the input image by solving the following two linear systems to obtain the output image that is filtered:

$$B'u' = g \quad (16)$$

$$Bu^T = u'^T \quad (17)$$

wherein $$B'_{ij} = \begin{cases} -\lambda(|L_i - L_j|^\alpha + \varepsilon)^{-1} & j \in N_2^y(i) \\ 1 - \sum_{k \in N_2^y(i)} B'_{ik} & i = j \\ 0 & \text{otherwise} \end{cases} \quad (18)$$

-continued $$B_{ij} = \begin{cases} -\lambda(|L_i^T - L_j^T|^a + \varepsilon)^{-1} & j \in N_2^y(i) \\ 1 - \sum_{k \in N_2^y(i)} B_{ik} & i = j \\ 0 & \text{otherwise} \end{cases} \quad (19)$$

Wherein, "g" represents the input image, "u" represents the output image, and L=ln(g). "i" and "j" represents the number of elements that are increasingly marked from left to right and from top to bottom in a matrix, $N_2^y(i)$ represents two adjacent elements (or pixels) at the top and the bottom sides of an element (or a pixel) "i" in the matrix "L" (or the input image). "α" and "λ" are two parameters. "α" takes a value of "1.0", and "λ" takes a value of "3.0". "α" taking a value of "1.0" represents that the output image is not sensitive to the gradient of the input image, and only very large gradient change in the input image can incur the gradient change in the output image. "λ" taking a value of "3.0" represents that the output image is very smooth.

Figure 3:
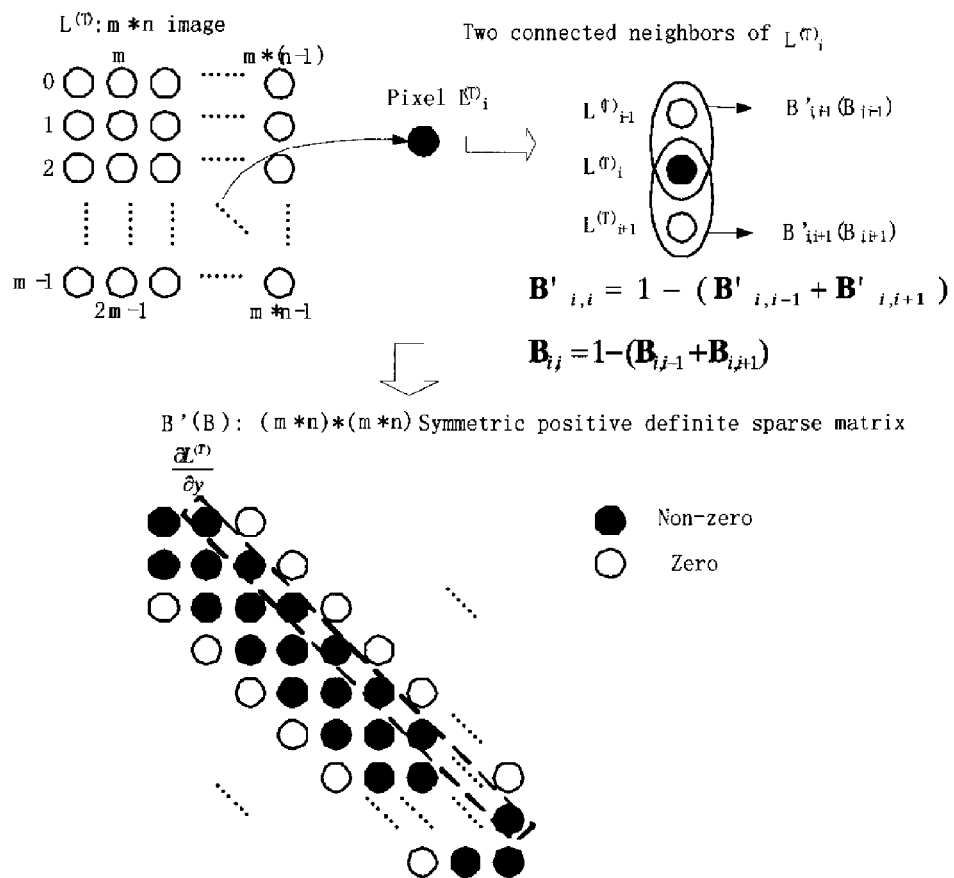
FIG. 3 illustrates a process of a fast WLS filter constructing matrixes "B" and "B"

The process of constructing the matrixes "B" and "B" is illustrated in FIG. 3. As only the element "i" and the two elements at the top side and the bottom side of the element "i" are considered, the matrixes "B" and "B" include non-zero element only on three diagonal lines.

As compared with the traditional WLS filter, the three-diagonal linear system can be solved easier. For example, "$LDL^T$" decomposition method can be used, and its time complexity is O(m*n). Obviously, the efficiency of the fast WLS filter is greatly improved as compared with that of the traditional WLS filter.

Figure 4:
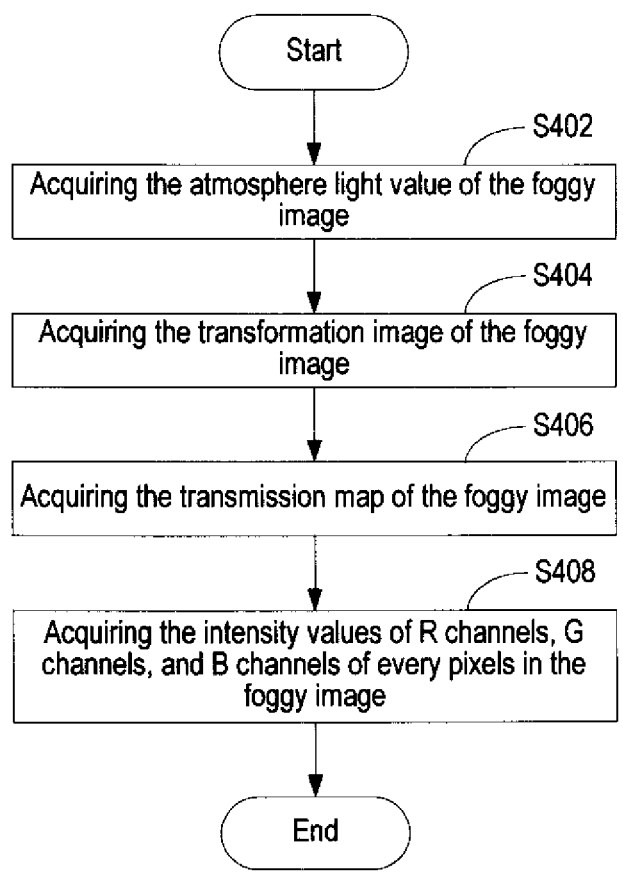
FIG. 4 illustrates a brief flow chart of an image defogging method based on dark channel prior in accordance with an embodiment of the invention.
Figure 5:
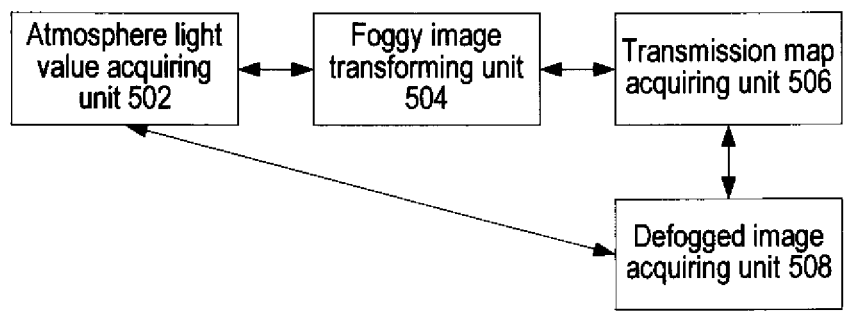
FIG. 5 illustrates a brief block diagram of an image defogging system based on dark channel prior in accordance with an embodiment of the invention.

FIG. 4 illustrates a brief flow chart of the image defogging method based on dark channel prior in accordance with an embodiment of the invention. FIG. 5 illustrates a brief block diagram of the image defogging system based on dark channel prior in accordance with an embodiment of the invention. The image defogging method and the image defogging system in accordance with an embodiment of the invention will be described in detail in combination of FIGS. 4 and 5.

As illustrated in FIG. 5, the image defogging system in accordance with an embodiment of the invention comprises an atmosphere light value acquiring unit 502, a foggy image transforming unit 504, a transmission map acquiring unit 506, and a defogged image acquiring unit 508, the functions of which are the following:

The atmosphere light value acquiring unit 502 is used for acquiring the minimum intensity values corresponding to every pixels in the foggy image, constituting the local minimum intensity image of the foggy image by using the minimum intensity values, and selecting the largest values of the intensity values of R channels, G channels, and B channels of all pixels in an area, which is covered by the brightest area of a predetermined size in the local minimum intensity image, in the foggy image as component values of a R channel, a G channel, and a B channel of an atmosphere light value, respectively (i.e. implementing step S402).

The foggy image transforming unit 504 is used for acquiring a transformation image of the foggy image by transforming the foggy image with the atmosphere light value of the foggy image (i.e. implementing step S404).

The transmission map acquiring unit 506 is used for acquiring the transmission map of the foggy image by edge-preserving filtering the transformation image of the foggy image (i.e. implementing step S406).

The defogged image acquiring unit 508 is used for acquiring the intensity values of R channels, G channels, and B channels of every pixels in a defogged image by using the transmission map and the atmosphere light value of the foggy image and the intensity values of R channels, G channels, and B channels of every pixels in the foggy image (i.e. implementing step S408).

Below, the process of performing defogging processing on the foggy image by the image defogging system to obtain the defogged image illustrated in FIG. 5 is described in detail.

Firstly, the atmosphere light value acquiring unit 502 sets the size of the local pixel block for acquiring the minimum intensity values corresponding to every pixels in the foggy image according to the size of the foggy image, finds out smallest intensity values in the intensity values of R channels, G channels and B channels of all pixels in local pixel blocks centered on every pixels "x" in the foggy image as the minimum intensity values corresponding the pixels "x", and constitutes the local minimum intensity image of the foggy image by using the minimum intensity values, and then selects the largest values of the intensity values of R channels, G channels and B channels of all pixels in the area covered by the brightest area that is 0.1% of the local minimum intensity image in the foggy image as the component values of R, G, B channels of the atmosphere light value "A" of the foggy image, respectively.

Next, the foggy image transforming unit 504 transforms the foggy image by using the atmosphere light value of the foggy image according to $$f(x) = 1 - \min_{c \in \{R,G,B\}} \frac{I^c(x)}{A^c}$$

to acquire the transformation image "f" of the foggy image. Here, the foggy image transforming unit 504 can also acquire the transformation image "f" of the foggy image according to $$f(x) = 1 - w \times \min_{c \in \{R,G,B\}} \frac{I^c(x)}{A^c}.$$

Next, the transmission map acquiring unit 506 edge-preserving filters the transformation image of the foggy image to acquire the transmission map "t" of the foggy image according to the equation (12) or the equation (13).

Finally, the defogged image acquiring unit 508 acquires the intensity values of R channels, G channels and B channels of every pixels in the foggy image by using the transmission map "t", the atmosphere light value "A", and the intensity values of R channels, G channels, and B channels of every pixels in the foggy image.

Here, the atmosphere light value acquiring unit 502 can set the size of the local pixel block for acquiring the minimum intensity values corresponding to every pixels in the foggy image according to the equations (5) and (6). The transmission map acquiring unit 506 can edge-preserving filters the transformation map of the foggy image according to the equations (14) and (15) (i.e. using the traditional WLS filter) or the equations (16)~(19) (i.e. using the fast WLS filter).

Wherein, in the process of the transmission map acquiring unit 508 edge-preserving filtering the transformation map of the foggy image by using the fast WLS filter, the fast WLS filter constructs two symmetric sparse tridiagonal matrixes by using the transformation image of the foggy image, and filters the transformation image of the foggy image by using the two symmetric sparse tridiagonal matrixes in turn. In the two symmetric sparse tridiagonal matrixes constructed by the fast WLS filter, each non-main-diagonal element of the first symmetric sparse tridiagonal matrix is a non-zero value only when its two corresponding pixels on the transformation image of the foggy image are in vertically neighboring locations, and each non-main-diagonal element of the second symmetric sparse tridiagonal matrix is a non-zero value only when its two corresponding pixels on the transformation image of the foggy image are in horizontally neighboring locations; or each non-main-diagonal element of the first symmetric sparse tridiagonal matrix is a non-zero value only when its two corresponding pixels on the transformation image of the foggy image are in horizontally neighboring locations, and each non-main-diagonal element of the second symmetric sparse tridiagonal matrix is a non-zero value only when its two corresponding pixels on the transformation image of the foggy image are in vertically neighboring locations.

In the process of the transmission map acquiring unit 508 edge-preserving filtering the transformation image of the foggy image by using the traditional WLS filter, the traditional WLS filter constructs a symmetric sparse matrix having five diagonal lines by using the transformation image of the foggy image and filters the transformation image of the foggy image by using the symmetric sparse matrix having five diagonal lines.

The invention is described above in reference with specific embodiments of the invention. However, the person skilled in the art will appreciate that various modification, combination and alteration can be made to these specific embodiments without departing from the spirit and scope defined by the accompany claims and equivalent thereof.

As compared with the image defogging method based on dark channel prior and soft matting, the invention significantly reduces the computation complexity at the same time of preserving good defogging effect, and thus significantly reduces the time taken by the defogging processing. As compared with the image defogging method based on a median filter, the invention provides higher defogged image effect at the same time of slightly reducing the time taken by the defogging processing.

The steps can be implemented by hardware or software as required. Note, steps can be added to or deleted from the flowchart shown in the specification, and steps in the flowchart can be modified without departing from the scope of the invention. In general, the flowchart is merely used to indicate a possible sequence of basic operations for implementing functions.

The embodiments of the invention can be implemented by using a programmed general digital computer, an application-specific integrated circuit, a programmable logic element, a field-programmable gate array, an optical, chemical, biological, quantum or nano-engineering system, component or infrastructure. In general, functions of the invention can be implemented by any well-known means in the art. Distributed or networked systems, components or circuits can be used. Communication or transmission of data can be wired, wireless, or by any other means.

It will be appreciated that in accordance with requirements of a particular application, one or more of elements shown in the accompany drawings can be implemented in a more discrete or integrated mode, or even be removed or disabled in some cases. Implementing programs or codes that can be stored in a machine-readable medium to allow a computer implement the above method is also within the spirit and scope of the invention.

In addition, any signal arrow in the accompany drawings shall be deemed as exemplary rather than limited, unless otherwise specifically indicated. When a term is predicted to make a capability of separating or combining unclear, the combination of components or steps will be deemed as having been described.

As to the above implementations, the following excursuses are further disclosed:

1. A method for image defogging, comprising:
acquiring minimum intensity values corresponding to every pixels in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively;
acquiring a transformation image of the foggy image by transforming the foggy image with the atmosphere light value of the foggy image;
acquiring a transmission map of the foggy image by edge-preserving filtering the transformation image of the foggy image; and
acquiring intensity values of R channels, G channels, and B channels of every pixels in a defogged image by using the transmission map and the atmosphere light value of the foggy image and the intensity values of R channels, G channels, and B channels of every pixels in the foggy image.

2. The method for image defogging of 1, characterized in edge-preserving filtering the transformation image of the foggy image by using a weighted least squares filter.

3. The method for image defogging of 2, characterized in that the weighted least squares filter constructs two symmetric sparse tridiagonal matrixes by using the transformation image of the foggy image, and filters the transformation image of the foggy image by using the two symmetric sparse tridiagonal matrixes in turn.

4. The method for image defogging of 3, characterized in that in the two symmetric sparse tridiagonal matrixes,
each non-main-diagonal element of the first symmetric sparse tridiagonal matrix is a non-zero value only when its two corresponding pixels on the transformation image of the foggy image are in vertically neighboring locations, and each non-main-diagonal element of the second symmetric sparse tridiagonal matrix is a non-zero value only when its two corresponding pixels on the transformation image of the foggy image are in horizontally neighboring locations; or
each non-main-diagonal element of the first symmetric sparse tridiagonal matrix is a non-zero value only when its two corresponding pixels on the transformation image of the foggy image are in horizontally neighboring locations, and each non-main-diagonal element of the second symmetric sparse tridiagonal matrix is a non-zero value only when its two corresponding pixels on the transformation image of the foggy image are in vertically neighboring locations.

5. The method for image defogging of 2, characterized in that the weighted least squares filter constructs a symmetric sparse matrix having five diagonal lines by using the transformation image of the foggy image and filters the transformation image of the foggy image by using the symmetric sparse matrix having five diagonal lines.

6. The method for image defogging of 1, characterized in that the size of the local pixel block for acquiring the minimum intensity values corresponding to every pixels in the foggy image is proportional to the size of the foggy image.

7. The method for image defogging of 6, characterized in that the number of pixels included in the length direction of the local pixel block is an odd number closest to a quotient obtained by diving the number of pixels included in the length direction of the local pixel block with 15, and the number of pixels included in the width direction of the local pixel block is an odd number closest to a quotient obtained by diving the number of pixels included in the width direction of the local pixel block with 15.

8. A system for image defogging, comprising:

an atmosphere light value acquiring unit for acquiring minimum intensity values corresponding to every pixels in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively;

a foggy image transforming unit for acquiring a transformation image of the foggy image by transforming the foggy image with the atmosphere light value of the foggy image;

a transmission map acquiring unit for acquiring a transmission map of the foggy image by edge-preserving filtering the transformation image of the foggy image; and a defogged image acquiring unit for acquiring intensity values of R channels, G channels, and B channels of every pixels in a defogged image by using the transmission map and the atmosphere light value of the foggy image and the intensity values of R channels, G channels, and B channels of every pixels in the foggy image.

9. The system for image defogging of 8, characterized in that the transmission map acquiring unit edge-preserving filters the transformation image of the foggy image by using a weighted least squares filter.

10. The system for image defogging of 9, characterized in that the weighted least squares filter constructs two symmetric sparse tridiagonal matrixes by using the transformation image of the foggy image, and filters the transformation image of the foggy image by using the two symmetric sparse tridiagonal matrixes in turn.

11. The system for image defogging of 10, characterized in that in the two symmetric sparse tridiagonal matrixes, each non-main-diagonal element of the first symmetric sparse tridiagonal matrix is a non-zero value only when its two corresponding pixels on the transformation image of the foggy image are in vertically neighboring locations, and each non-main-diagonal element of the second symmetric sparse tridiagonal matrix is a non-zero value only when its two corresponding pixels on the transformation image of the foggy image are in horizontally neighboring locations; or each non-main-diagonal element of the first symmetric sparse tridiagonal matrix is a non-zero value only when its two corresponding pixels on the transformation image of the foggy image are in horizontally neighboring locations, and each non-main-diagonal element of the second symmetric sparse tridiagonal matrix is a non-zero value only when its two corresponding pixels on the transformation image of the foggy image are in vertically neighboring locations.

12. The system for image defogging of 9, characterized in that the weighted least squares filter constructs a symmetric sparse matrix having five diagonal lines by using the transformation image of the foggy image and filters the transformation image of the foggy image by using the symmetric sparse matrix having five diagonal lines.

13. The system for image defogging of 8, characterized in that the size of the local pixel block for acquiring the minimum intensity values corresponding to every pixels in the foggy image is proportional to the size of the foggy image.

14. The system for image defogging of 13, characterized in that the number of pixels included in the length direction of the local pixel block is an odd number closest to a quotient obtained by diving the number of pixels included in the length direction of the local pixel block with 15, and the number of pixels included in the width direction of the local pixel block is an odd number closest to a quotient obtained by diving the number of pixels included in the width direction of the local pixel block with 15.

What is claimed is:

1. A method for image defogging, comprising:

acquiring minimum intensity values corresponding to every pixel in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively;

acquiring a transformation image of the foggy image by transforming the foggy image with the atmosphere light value of the foggy image;

acquiring a transmission map of the foggy image by edge-preserving filtering the transformation image of the foggy image; and acquiring intensity values of R channels, G channels, and B channels of every pixel in a defogged image by using the transmission map and the atmosphere light value of the foggy image and the intensity values of R channels, G channels, and B channels of every pixel in the foggy image.

2. The method for image defogging of claim 1, wherein the edge-preserving filtering the transformation image of the foggy image occurs by using a weighted least squares filter.

3. The method for image defogging of claim 2, wherein the weighted least squares filter constructs two symmetric sparse tridiagonal matrixes by using the transformation image of the foggy image, and filters the transformation image of the foggy image by using the two symmetric sparse tridiagonal matrixes in turn.

4. The method for image defogging of claim 3, wherein in the two symmetric sparse tridiagonal matrixes, each non-main-diagonal element of the first symmetric sparse tridiagonal matrix is a non-zero value only when its two corresponding pixels on the transformation image of the foggy image are in vertically neighboring locations, and each non-main-diagonal element of the second symmetric sparse tridiagonal matrix is a non-zero value only when its two corresponding pixels on the transformation image of the foggy image are in horizontally neighboring locations; or each non-main-diagonal element of the first symmetric sparse tridiagonal matrix is a non-zero value only when its two corresponding pixels on the transformation image of the foggy image are in horizontally neighboring locations, and each non-main-diagonal element of the second symmetric sparse tridiagonal matrix is a non-zero value only when its two corresponding pixels on the transformation image of the foggy image are in vertically neighboring locations.

5. The method for image defogging of claim 2, wherein the weighted least squares filter constructs a symmetric sparse matrix having five diagonal lines by using the transformation image of the foggy image and filters the transformation image of the foggy image by using the symmetric sparse matrix having five diagonal lines.

6. The method for image defogging of claim 1, wherein the size of the local pixel block for acquiring the minimum intensity values corresponding to every pixel in the foggy image is proportional to the size of the foggy image.

7. The method for image defogging of claim 6, wherein the number of pixels included in the length direction of the local pixel block is an odd number closest to a quotient obtained by dividing the number of pixels included in the length direction of the local pixel block by 15, and the number of pixels included in the width direction of the local pixel block is an odd number closest to a quotient obtained by dividing the number of pixels included in the width direction of the local pixel block by 15.

8. A system for image defogging, comprising:
   an atmosphere light value acquiring unit for acquiring minimum intensity values corresponding to every pixel in a foggy image, constituting a local minimum intensity image of the foggy image by using the minimum intensity values, and selecting the largest values of the intensity values of R channels, G channels, and B channels of all pixels in an area, which is covered by a brightest area of a predetermined size in the local minimum intensity image, in the foggy image as component values of a R channel, a G channel, and a B channel of an atmosphere light value, respectively;
   a foggy image transforming unit for acquiring a transformation image of the foggy image by transforming the foggy image with the atmosphere light value of the foggy image;
   a transmission map acquiring unit for acquiring a transmission map of the foggy image by edge-preserving filtering the transformation image of the foggy image; and
   a defogged image acquiring unit for acquiring intensity values of R channels, G channels, and B channels of every pixel in a defogged image by using the transmission map and the atmosphere light value of the foggy image and the intensity values of R channels, G channels, and B channels of every pixel in the foggy image.

9. The system for image defogging of claim 8, wherein the transmission map acquiring unit edge-preserving filters the transformation image of the foggy image by using a weighted least squares filter.

10. The system for image defogging of claim 9, wherein the weighted least squares filter constructs two symmetric sparse tridiagonal matrixes by using the transformation image of the foggy image, and filters the transformation image of the foggy image by using the two symmetric sparse tridiagonal matrixes in turn.

* * * * *